United States Patent
Hung-Hsin

Patent Number: 5,374,073
Date of Patent: Dec. 20, 1994

[54] TRACTIVE BAGGAGE HANDCART

[76] Inventor: Hsieh Hung-Hsin, 15F, No.83, Sec.1, Chung-Hsiao East Rd., Taipei, Taiwan, Prov. of China

[21] Appl. No.: 14,726
[22] Filed: Feb. 8, 1993
[51] Int. Cl.$^5$ ............................................. B62B 1/12
[52] U.S. Cl. ........................ 280/30; 190/18 A; 280/655; 280/47.25; 297/130
[58] Field of Search .............. 190/18 A; 297/14, 18, 297/46, 56, 57, 60, 130; 280/30, 654, 655, 47.26, 47.27, 47.24, 47.25, 47.29

[56] References Cited

U.S. PATENT DOCUMENTS

| | | | |
|---|---|---|---|
| 2,699,557 | 1/1955 | Gravatt | 297/60 X |
| 4,846,486 | 7/1989 | Hobson | 280/47.26 X |
| 4,974,871 | 12/1990 | Mao | 280/655 X |
| 5,161,811 | 11/1992 | Cheng | 280/655 X |
| 5,178,404 | 1/1993 | Chen | 280/655 |

Primary Examiner—Mitchell J. Hill
Assistant Examiner—Michael Mar
Attorney, Agent, or Firm—Young & Forward

[57] ABSTRACT

The present invention is related to a tractive baggage handcart comprising a travel case, a tractive retractable device on the back of said travel case, a base retractable device on the bottom of said travel case, a tie belt and a foldable chair, wherein the tractive retractable device is provided with telescopic upper, middle and lower retractable pipes for shortening or lengthening the vertical dimension of the handcart. An extensible shelf is slidably mounted on the underside of the base for supporting a second travel case in front of the travel case positioned on the base. The tie belt can be extended around the two travel cases to retain them as a unitary package on the handcart.

3 Claims, 6 Drawing Sheets

TRACTIVE BAGGAGE HANDCART

BACKGROUND OF THE INVENTION:

The present invention is related to the structure of a tractive baggage handcart and particularly to both a baggage case and a travel handcart in one body which can be conveniently drawn forward by the user a foldable chair is attached to the handcart.

Since the air traffic is convenient and the international commerce and travel are booming day after day, a number of passengers carrying their many travel cases and baggage bags walking to and fro can be seen in the large halls of various air ports at all times. Since the travel cases in general are cumbersome, carrying them while walking will have to be very painstaking and inconvenient, consequently there are baggage handcarts for carrying travel cases from place to place using such handcarts can lighten the task of transporting such travel cases. However, the use of such baggage handcarts is somewhat limited. When the travel cases are not firmly fixed on the baggage handcart, it is possible that the travel cases will fall from the said handcart from time to time. Therefore, the foregoing baggage handcarts cannot very firmly carry a number of travel cases at the same time.

So far as carrying the travel cases by means of the conventional baggage handcart is concerned, the passengers have to separate the said cases from the said handcarts while walking upstairs and downstairs, and then carry the said cases and handcarts respectively so that they can go upstairs or downstairs. It is obvious that the use of conventional baggage handcarts is very inconvenient.

On the other hand, passengers carrying their cumbersome travel cases have to line up for booking, inspection, clearance and wait for departure, so that the passengers become very tired of walking. In some circumstances, there is not a chair for passengers to take a rest, so many passengers sit down onto the travel cases they carried. Such behavior not only tends to press and damage the travel cases but also tends to be very awkward.

SUMMARY OF THE INVENTION

The design of travel case according to the present invention is an improvement on the foregoing defect of said conventional baggage handcart. Through the travel case of the present invention which can be integrated with the tractive retractable device equipped with wheels, the travel cases loaded on the handcart will never come off or fall drown therefrom, and the cumbersome travel cases can also be moved in a tractive manner. This is the major object of the present invention.

Another object of the present invention is to offer a foldable chair for the users who can make use of it to take a temporary rest.

BRIEF DESCRIPTION OF THE DRAWINGS

FIG. 7-1 is a schematic view of upper and middle retractable pipes contracting toward lower retractable pipe according to the present invention.

FIG. 7-2 is a schematic view of positioning pin resisting against slide way in according with the present invention.

FIG. 7-3 is a schematic view of upper and middle retractable pipes having contracted into lower retractable pipe in accordance with the present invention.

FIG. 7-4 is a partial section view of upper retractable pipe, spring and positioning pin according to the present invention.

DETAILED DESCRIPTION

The present invention can be best described in detail as follows so that the structure, characteristics and purpose of the present invention can be readily understood.

Figure 1:
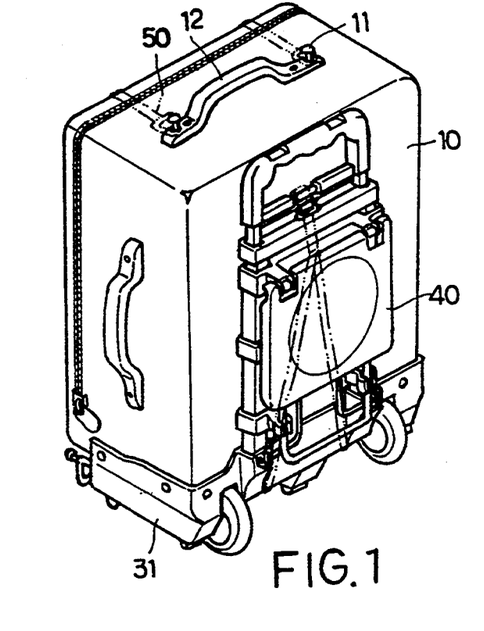
FIG. 1 is an elevational appearance view of baggage handcart in a contractive and folded state according to the present invention.
Figures 2, 9:
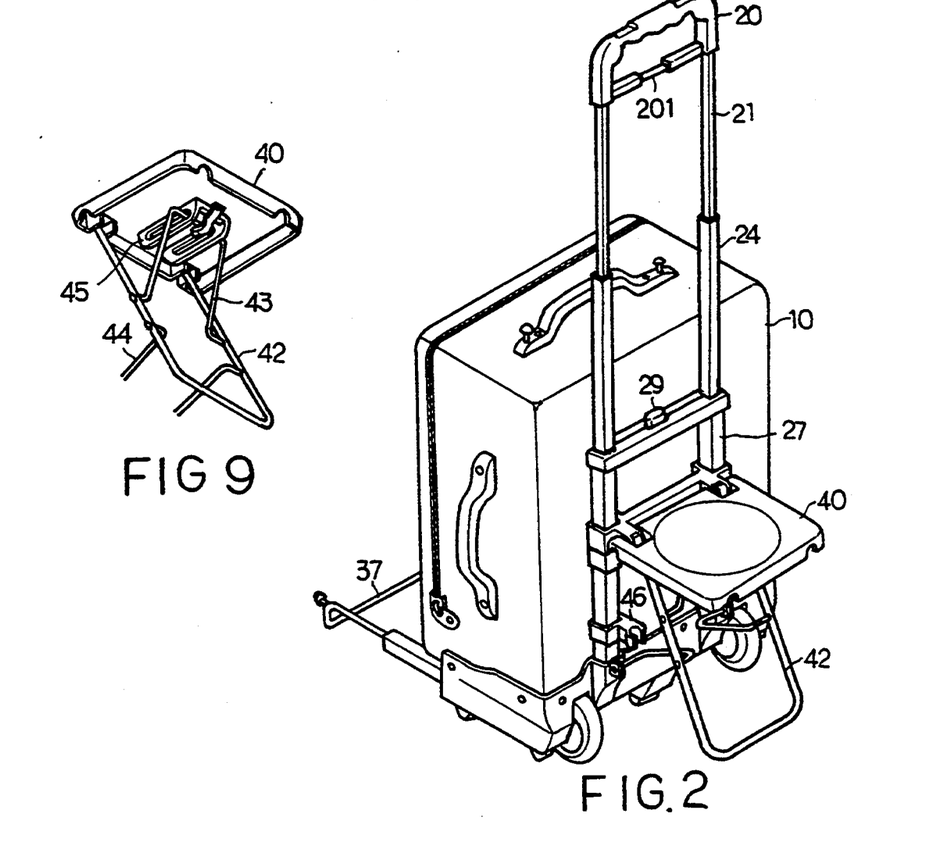
FIG. 2 is an elevational appearance view of baggage handcart in a stretch state according to the present invention.
FIG. 9 is a top elevational view of foldable chair of the present invention.
Figure 3:
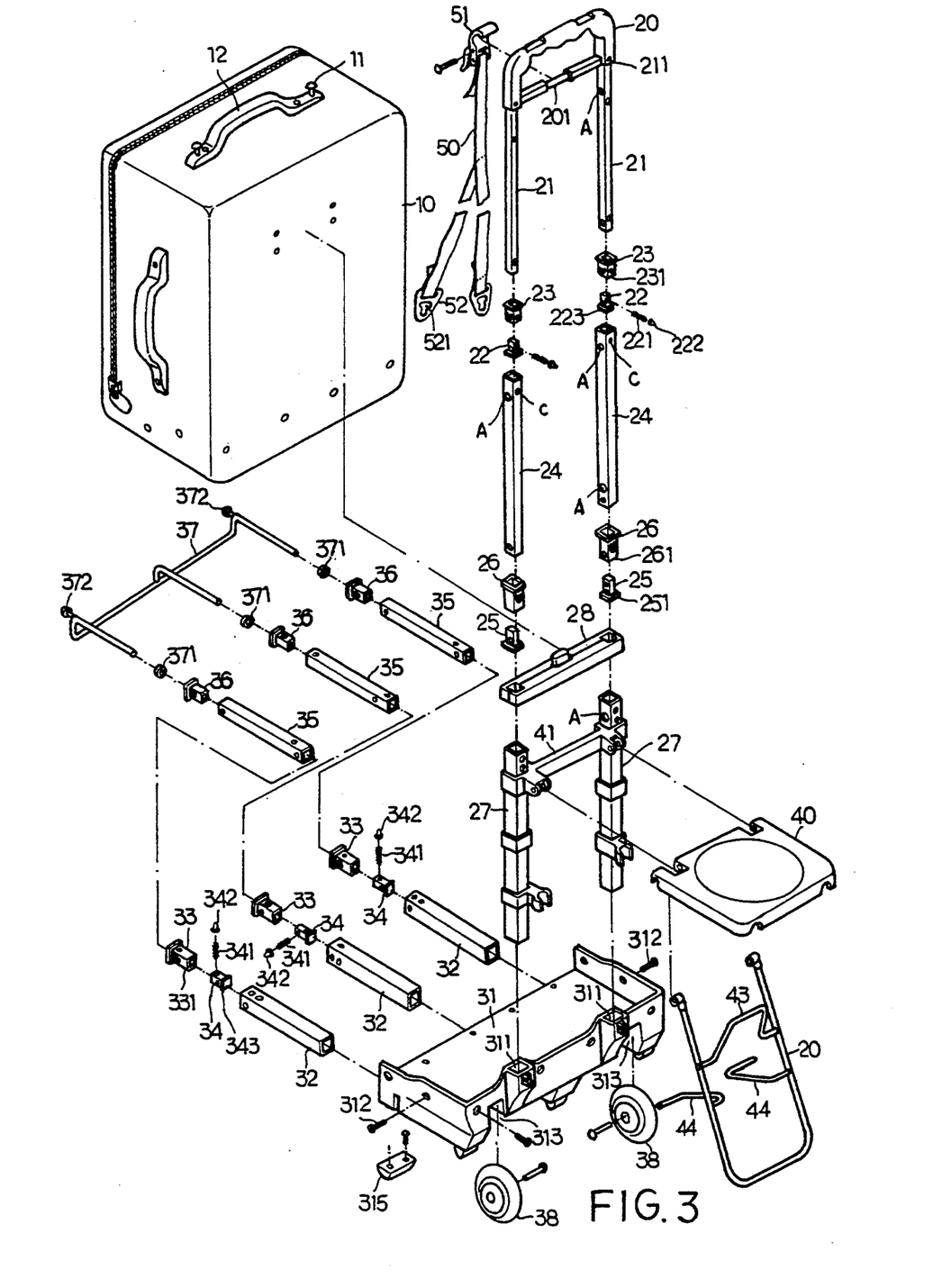
FIG. 3 is a breakdown view of baggage handcart of the present invention.

As shown in FIG. 1, 2 and 3, the present invention consists essentially of a travel case, a tractive retractable device on the back of said travel case, a base retractable device on the bottom of said travel case, a tie belt and a foldable chair.

The said travel case (10) is made of a hard case body, and the tractive retractable device firmly fixed on the back thereof consists of a handle or hand gripper (20), two upper retractable pipes (21), two upper pipe seats (22), two middle pipe jackets (23), two middle retractable pipes (24), two middle pipe seats (25), two lower pipe jackets (26), two lower retractable pipes (27) and a set of cross beams (28).

As shown in FIG. 3, the upper ends of said two upper retractable pipes (21) are directly fixed onto the hand gripper (20) by means of rivets (211), the lower ends thereof are provided with upper pipe seats (22) wherein a spring (221) and a positioning pin (222) with a smooth arced surface are disposed; in addition, the upper ends of said two middle retractable pipes (24) are provided with two middle pipe jackets (23), and the lower ends thereof are provided with two middle pipe seats (25). When the upper retractable pipes (21) are pulled upwardly in the said middle retractable pipes (24), the flanges (223) of upper pipe seats (22) on the upper retractable pipes (21) contact the walls (231) at the lower ends of middle pipe jackets (23) so that the upper retractable pipes (21) can slide and contract inside the middle retractable pipes (24) without coming off. The lower ends of said two lower retractable pipes (27) are inserted and fixed in the fixing holes (311) on a base (31) so that the said two lower retractable pipes (27) are integrated with the base (31). The upper ends of the lower retractable pipes (27) are provided with the lower pipe jackets (26). When the middle retractable pipes (24) are pulled upwardly in the said lower retractable pipes (27), the flanges (251) of middle pipe seats (25) on the middle retractable pipes (24) resist against the wall (261) at the lower ends of lower pipe jackets (26) so that the middle retractable pipe jackets (26) can slide and contract inside the lower retractable pipes (27) without coming off.

Figure 4:
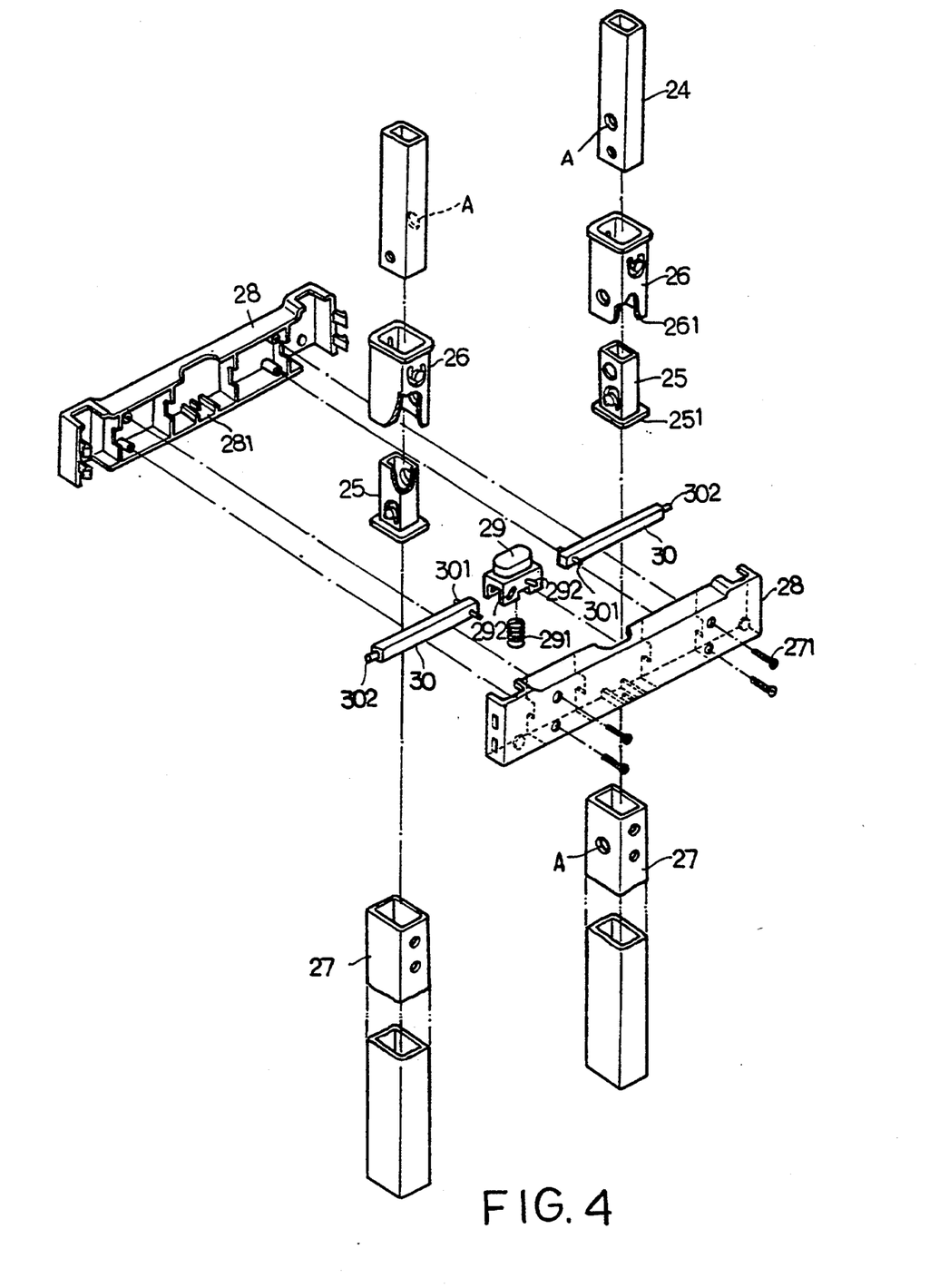
FIG. 4 is a breakdown view of cross beam of the present invention.
Figure 5:
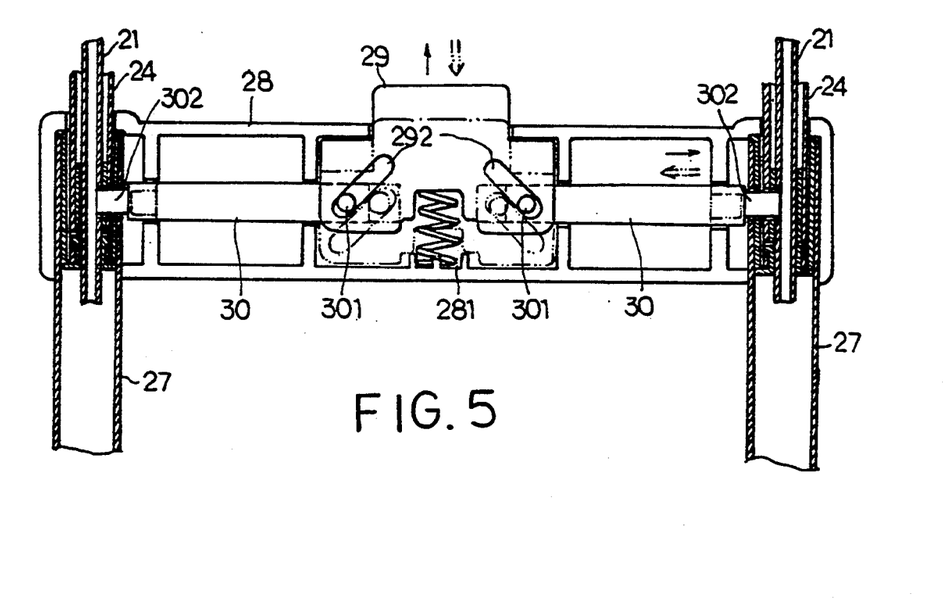
FIG. 5 is a schematic view of control action of linkage rod and upper, middle and lower retractable rods of the present invention.

As shown in FIG. 3, 4 and 5, mated beam sections (28) are installed at the top ends of lower retractable pipes (27) to tightly wrap the lower retractable pipes (27) without coming off, and fixed onto the back of travel case (10) by means of screws (271) so that the lower retractable pipes (27) and the tractive retractable device as a whole can be firmly assembled with the travel case (10). A guide way (281) inside the set of beams (28) can catch and fix a compression spring (291) whereon an operating push button (29) may be provided so that the operating push button (29) can press the compression spring (291). Two bevel holes or slots (292) are provided in the two side walls of said operating push button (29) so as to dispose two linkage rods (30) therein. A pair of symmetric lugs (301) at one end of each linkage rod (30) are disposed in the said bevel holes (292) for reciprocal motion within the length of holes (292); and a pin (302) at another end of each linkage rod (30) can control the retractable action of middle retractable pipes (24) inside the lower retractable pipes (27).

Figure 6:
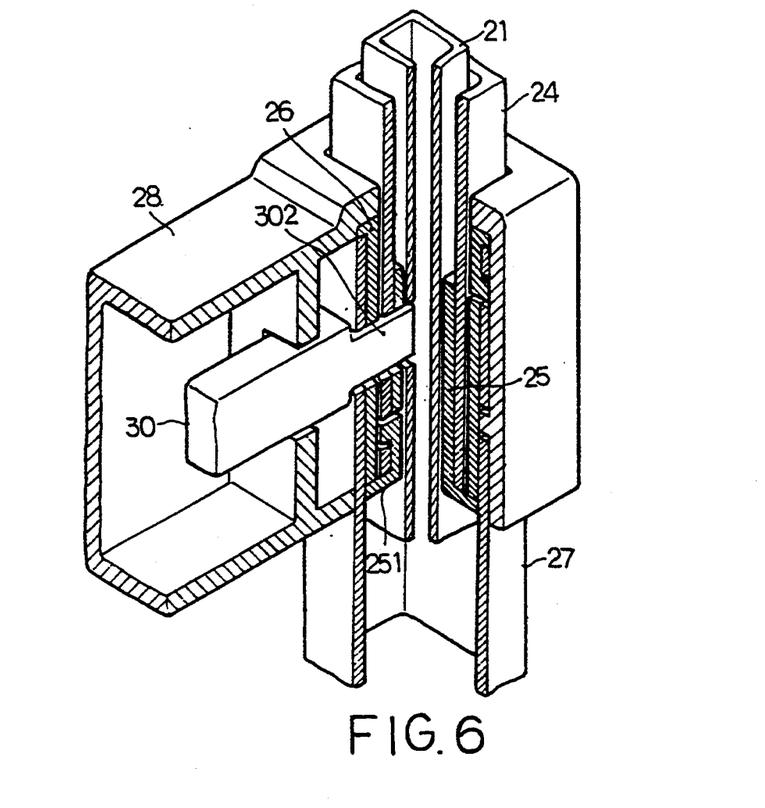
FIG. 6 is a partial section view when the linkage rod and upper, middle and lower retractable rods catch each other according to the present invention.

As shown in FIG. 3, 5 and 6, when the operating push button (29) is not pressed, the lugs (301) of linkage rods (30) are located at the bottom and on the utmost outer side of bevel holes (292) so that the pins (303) can be inserted into the inserting holes A on the said lower, middle and upper retractable pipes (27), (24), (21) respectively in order to fix the middle and upper retractable pipes (24), (21) without sliding. As shown by the dotted lines in the said drawings, when the operating push button (29) is pressed to move downward, the bevel holes (292) will actuate the lugs (301) to move inward and upward along the inclined planes of these holes (292) and force the lugs (301) to stop at the top ends on the utmost inner sides thereof, so the pins (302) of linkage rods (30) disengage from the inserting holes A on the said lower, middle and upper retractable pipes (27), (24), (21) respectively. At the same time, the middle and upper retractable pipes (24), (21) are movable so that the user can pull out the middle and upper retractable pipes (24), (21) from the lower retractable pipe (27) as shown in FIG. 2. Alternately the user can compress the middle and upper retractable pipes (24), (21) back into the lower retractable pipe (27) as shown in FIG. 1.

As shown in FIG. 3, 7-1 and 7-4, when it is desired to contract the upper retractable pipe (21) downwardly into middle retractable pipe (24), the push button (29) is pressed to contract the middle retractable pipe (24) into the lower retractable pipe (27). The positioning pin (222) at the lower end of upper retractable pipe (21) will resist against the slide way B of beam (28), but will upper contract inward, so there is a movable state between the upper and middle retractable pipes (21), (24). The upper retractable pipe (21) together with the middle retractable pipe (24) can easily contract into the lower retractable pipe (27) (as shown in the contracted state in FIG. 1). When it is desired to pull out the upper retractable pipe (21) from the middle retractable pipe (24), the operating push button (29) is pressed to achieve a movable state between the middle and upper retractable pipes (24), (21) and the lower retractable pipe (27). The user can pull out the middle and upper retractable pipes (24), (21) from the lower retractable pipe (27) (as shown in FIG. 2); when the positioning pin (222) at the lower end of upper retractable pipe (21) disengages from the lower retractable pipe (27), the said pin (222) is subject to the elastic force of spring (221) and projected out of the snap hole C on middle retractable pipe (24) so there is a fixed state between middle and upper retractable pipes (24), (21) to facilitate manual transportation of travel case 10.

As shown in FIG. 3, the base retractable device on the bottom of travel case (10) of the present invention consists of a base (31), three base slide pipes or tubes (32), three base slide pipe jackets (33), three base retractable pipe seats (34), three base retractable pipes or tubes (35), three base retractable pipe jackets (36), a base retractable frame (37) and two wheels (38); frame 37 comprises three parallel rods and a transverse connector rod element. The base (31) is riveted onto the bottom of travel case (10) by means of a plurality of rivets (312) so the said case (10) and base (31) are integrated with each other as one body. The two fixing holes (311) on the base (31) are designed to insert and fix the said two lower retractable pipes (27) therein, and the two inserting grooves (313) on the bottom of base (31) are designed to install two wheels (38) to facilitate transport of travel case (10) while the user guides the handcart. The two leg seats (315) on the bottom of base (31) are designed to let the travel case (10) be stable while the handcart is disposed to stand up as shown in FIG. 1 or FIG. 2.

Figure 8:
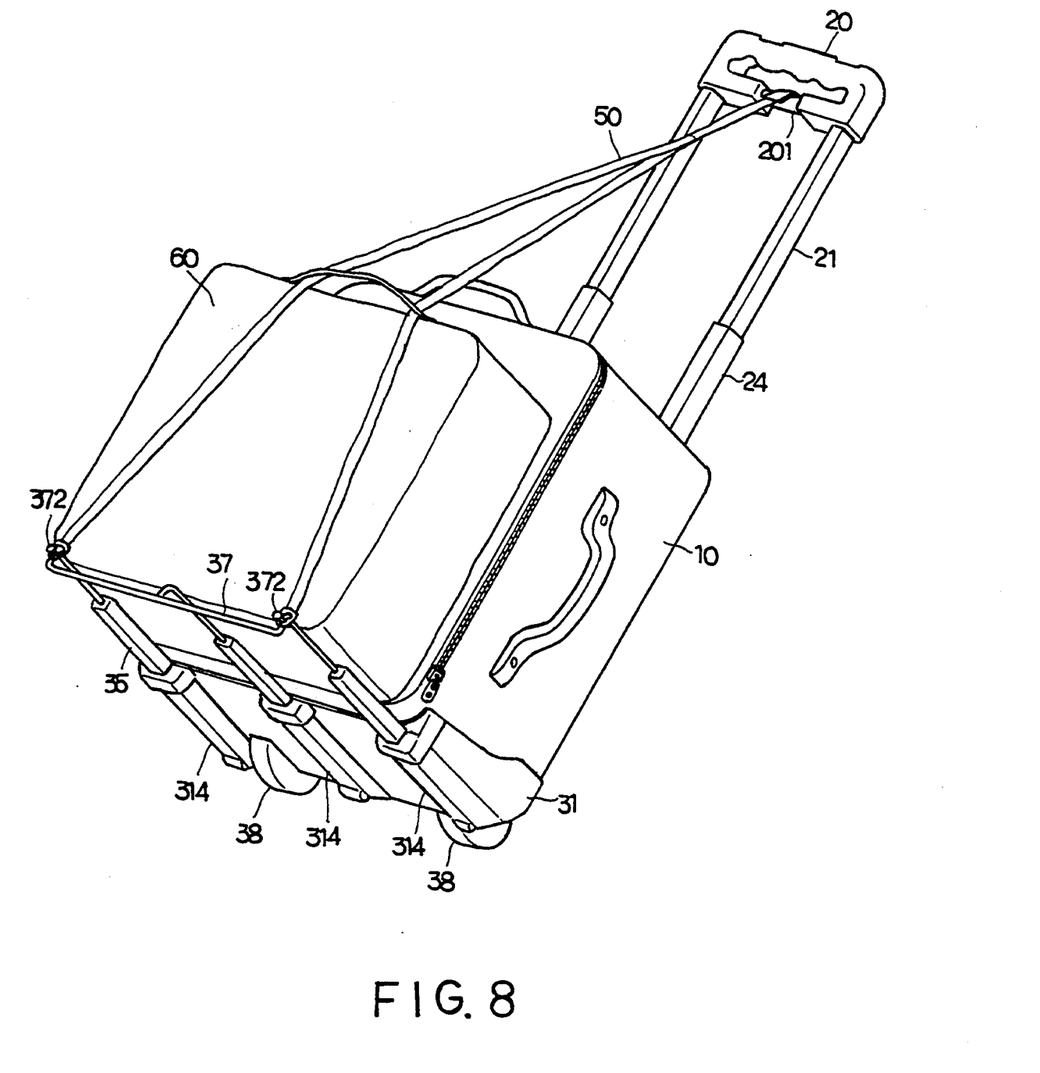
FIG. 8 is another example of the present invention capable of loading another travel case thereon.

As shown in FIG. 3 and 8, the three base slide pipes or tubes (32) are directly as a whole inserted and fixed into the sleeve (314) of base (31), and the end of base slide pipe (32) is provided with a base slide pipe jacket (33); one end of each base retractable pipe or tube (35) is provided with a base retractable pipe seat (34) wherein a spring (341) and a positioning pin (342) with a smooth arced surface are disposed, and another end thereof is provided with a base retractable pipe jacket (36); when the base retractable pipe (35) is assembled into the said three base slide pipes (32), the flange (343) of base retractable pipe seat (34) of base retractable pipe (35) resists against the wall (331) at the lower end of base slide pipe jacket (33) so that the base retractable pipe (35) can slide and contract in the base slide pipe (32) without disengagement therefrom; the principle and action of free retractility or catching and fixing of base retractable pipe (35) inside the base slide pipe (32) are the same as those of upper retractable pipe (21) inside the middle retractable pipe (24), so it is unnecessary to repeat same here again. In addition, the rods that form base retractable frame (37) are directly assembled into the base retractable pipes (35), and a base stop block (371) retains the base retractable frame (37) in the base retractable pipe (35) so that the base retractable frame (37) can slide and contract inside the base retractable pipe (35) without disengagement. Through the action of retractable slide of both base retractable pipe (35) and base retractable frame (37) inside the base slide pipe (32), the horizontal loading area of travel case (10) can be enlarged, so another travel case (60) can be conveniently loaded thereon at the same time as shown in FIG. 8 tubes 32 and 35, together with frame 37, collectively form a retractible shelf means adapted to support travel case 60 in close proximity to travel case 10.

Figure 10:
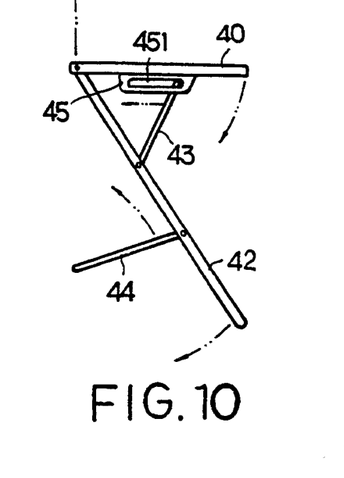
FIG. 10 is a side schematic view of the chair of the present invention in a folded state.
Figure 71:
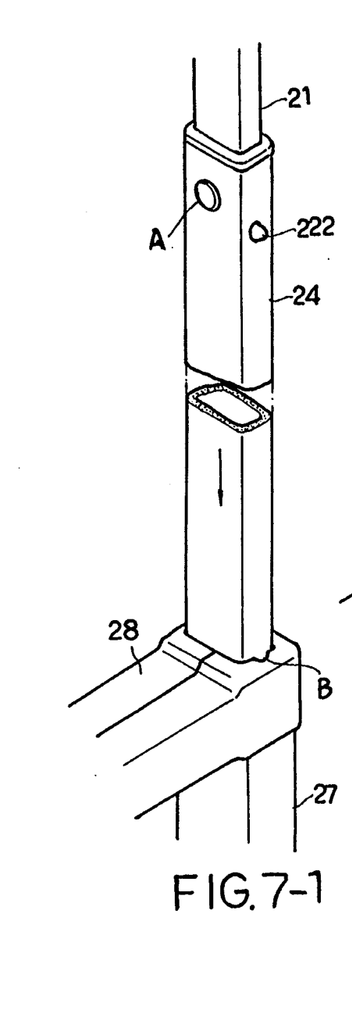
Figure 72:
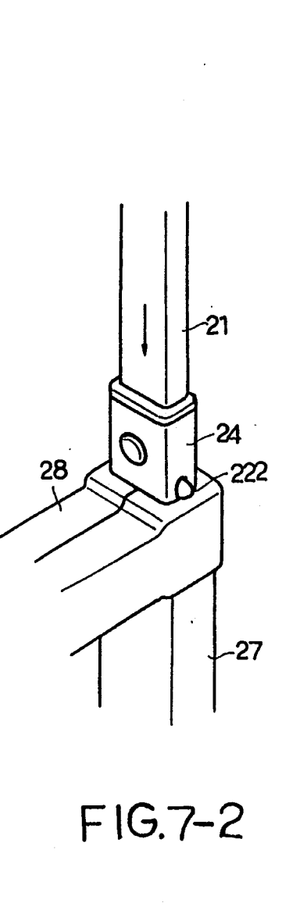
Figure 73:
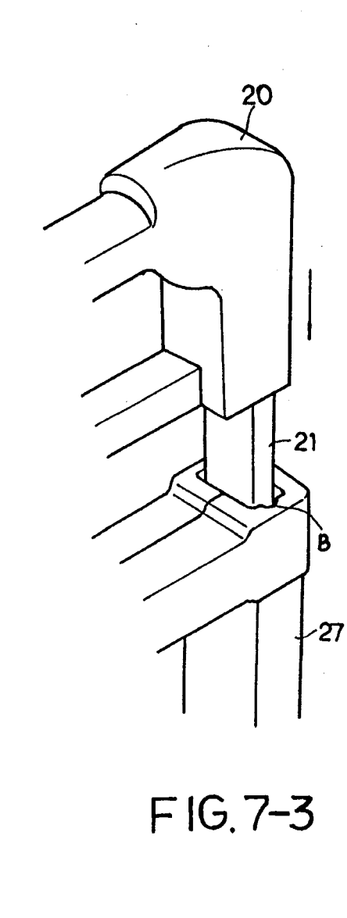
Figure 74:
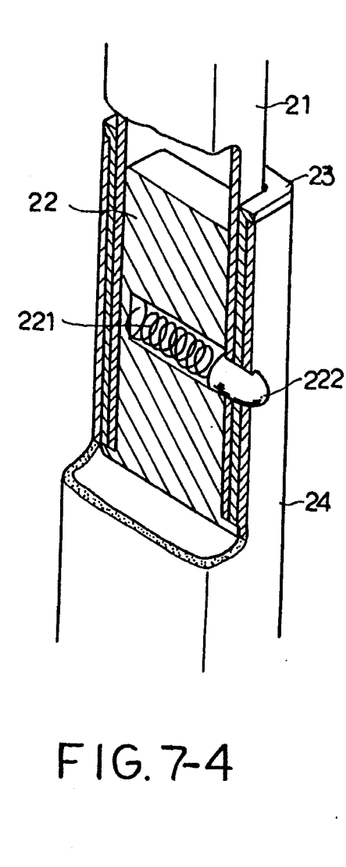

As shown in FIG. 3, 9 and 10, a foldable chair of the present invention consists essentially of a seat platform (40), a movable frame or bracket (41), a movable leg (42), an upper support strut (43) and two lower support struts (44); the movable bracket (41) is directly mounted on the lower pipes (27) for movement up and down along the said pipes. One edge of seat platform (40) is movably pivoted onto the movable bracket (41) so that it can be disposed vertically (as shown in FIG. 1) or horizontally (as shown in FIG. 2); in addition, the upper end of movable leg (42) is pivoted on the bracket (41) in a movable state, while the lower end thereof is used as a leg to contact the floor.

As shown in FIG. 9, 10, 1 and 2, the bottom of seat platform (40) is provided with a slideway (45) which forms slots (451). The upper end of upper support (43) is disposed in the said the lower (451) and another end thereof is pivotably installed on the movable leg (42) in a mutually movable state. One end of lower support (44) is pivotably installed on the movable leg (42) in a mutually movable state, and the other end thereof is pivotably connected to ears located at the lower ends of retractable pipes (27). When the chair is not to be used, the movable leg (42) is caught in a clamp (46) on the wall of each lower retractable pipe (27) so that seat platform (40) is in a folded state as shown in FIG. 1. However when the user intends to sit down onto the seat, the seat platform (40) is pulled away from pipes (27) so as to let the movable leg (42) disengage from the clamps 46. At the same time, the seat platform 40 pivots from a vertical direction to a horizontal direction (the movable bracket (41) will move downward from upward) to force the upper and lower supports (43), (44) outward until the upper support (43) resists against the outer ends of slots (451) in a fixed state. The seat platform (40) can be oriented horizontally as shown in FIG. 2 for the user to sit down thereon. In the seat position depicted in FIG. 2 bracket 41 rests on two ledge elements fixed on pipes 27, whereby the bracket 41 is firmly supported against downward collapse on pipes 27.

The upper end of a set of tie belt (50) of the present invention is provided with a hook 51, and the lower end thereof is provided with two hook rings (52); when the travel case of the present invention has been folded as shown in FIG. 1, the snap holes (521) on the two hook rings (52) are first nested into the projected snaps (11) fixed on the travel case (10), belt 50 is then extended around the said case (10) and up to the back of said case (10) so that the hook (51) on the said belt (50) can hook on the hanging bar (201)3. The said case (10) and handcart are packed into one body so that the user can grip the gripper (12) while walking ahead. As shown in FIG. 8, another travel case (60) can be loaded onto the said case (10), by first pulling out the base retractable frame (37) and base retractable pipe (35) on the bottom surface of travel case (10) and, then placing case (60) onto the base retractable frame (37) and base retractable pipe (35). As shown in FIG. 8, the two hook rings (52) of tie belt (50) can be connected to the projected snap (372) on the base retractable frame (37), and then hook (51) of said belt (50) can be hooked over the hanging bar (201) of gripper (20) so as to pack these two cases (10), (60) into compact body for transportation purposes.

I claim:

1. A tractive baggage handcart comprising:
a base (31) having a front end and a rear end; two ground wheels (38) connected to said base at its rear end for movably supporting said base above the ground surface;
a first travel case (10) having a lower end affixed to said base so that said travel case extends vertically upwardly from said base; said base having an undersurface; a retractible-extendable shelf means slidably mounted on the undersurface of said base for movement between a retracted position located between the base front and rear ends, and an extended position projecting beyond the base front end;
a second travel case (60) positionable on said shelf means in close proximity to said first travel case when said shelf means is in its extended position;
an extensible-collapsible upstanding frame means connected to the rear end of said base; said frame means extending upwardly from said base to form a backrest for the first travel case; said frame means comprising a pair of lower pipes (27) attached to said base, a pair of intermediate pipes (24) slidably telescoped into said lower pipes, a pair of upper pipes 21 slidably telescoped into said intermediate pipes, and a hanger bar (201) interconnecting said upper pipes;
a tie-down belt means (50) having opposite ends thereof attachable to said hanger bar and to said shelf for retaining said second travel case against toppling from said shelf means; and
a foldable chair pivotably mounted on said upstanding frame means for movement between a folded position lying against the frame means and an operating position extending away from the frame means, wherein said chair comprises two ledge members affixed to said lower pipes above the rear end of said base; a bracket means (41) slidably mounted on said lower pipes for vertical adjustment between a first position supported on said ledge members and a second raised position spaced above said ledge members; a seat platform (40) having a rear end pivotably attached to said bracket means, and a front end spaced from the seat platform rear end; said seat platform having an upper surface and an undersurface; a ground-engageable leg means (42) swingably connected to said bracket means for movement between a retracted position lying against said upstanding frame means and a seat-support position acutely angled from said upstanding frame means; an upper strut means (43) having a lower end pivotably connected to said leg means and an upper end slidably connected to the undersurface of said seat platform; and a lower strut means (44) having a first end thereof pivotably connected to said leg means and a second end thereof pivotably connected to said upstanding frame means at said base;
said lower strut means (44) being swingable in an upward are around its pivotable connection with the frame means, whereby said leg means is lifted to its retracted position, and said bracket means is adjusted upwardly on said lower pipes;
said upper strut means (43) being pivotable around its pivotable connection with said leg means, whereby the upper end of said upper strut means slides along the seat platform toward the platform rear end, so that the platform can swing downwardly around its pivotable attachment to the bracket means.

2. The baggage handcart of claim 1, and further comprising a clamp means (46) carried on said lower pipes for clamping engagement with said leg means when said leg means is in its retracted position.

3. The baggage handcart of claim 1, wherein said shelf means comprises a first set of tubes (32) mounted on the undersurface of said base, a second set of tubes (35) slidably telescoped into said first set of tubes, a set of rods slidably telescoped into said second set of tubes, and a transverse connector element interconnecting said rods, whereby said connector element can be pulled to move the shelf means to its extended position or pushed to move the shelf means to its retracted position.

* * * * *